INVENTOR
ANDREW R. LANG
BY Rines and Rines
ATTORNEY

United States Patent Office 2,805,341
Patented Sept. 3, 1957

2,805,341

DIFFRACTOMETER

Andrew R. Lang, Cambridge, Mass.

Application July 12, 1954, Serial No. 442,566

5 Claims. (Cl. 250—53)

The present invention relates to diffractometers.

Specimens are commonly analyzed with the aid of X-rays that are caused to impinge thereon in the form of a diverging primary beam that is reflected therefrom by diffraction in the form of a converging beam, and that are detected after passing through a straight-line reception slit disposed at the focus of the converging beam. The specimen is mounted upon a rotatably adjustable support.

The source of the X-rays and the straight-line reception slit are disposed along the surface of a circular cylinder coaxial with the axis of rotation of the support. The specimen is scanned by adjustably rotating the straight-line reception slit along the surface of the cylinder at double the rate of rotatable adjustment of the specimen.

An object of the invention is to improve the precision of the analysis obtained with diffractometers of the above-described character.

A further object of the invention is to improve the intensity of the characteristic X-rays diffracted by reflection from a reflection specimen relative to the background scattering through further reflection by diffraction with the aid of a reflection monochromator.

With the above ends in view, a feature of the invention resides in the provision of a reflection crystal monochromator from which are reflected the X-rays transmitted through the reception slit in the form of a secondary diverging beam. The secondary diverging beam is reflected by diffraction from the crystal monochromator in the form of a converging X-ray beam that is transmitted through a detection slit disposed at the focus of this converging beam. The data obtained by detecting the X-ray beam transmitted through the detection slit are more precise than those obtained by detecting the X-ray beam transmitted through the reception slit. The monochromator crystal, the detection slit and the detector are rotatably adjustable about the said axis of rotation as a unit with the reception slit, at double the rate of rotatable adjustment of the specimen about the said axis of rotation, to an optimum position for effecting the recording of the data.

Other and further objects of the invention will be explained hereinafter and will be particularly pointed out in the appended claims.

Figure 1:
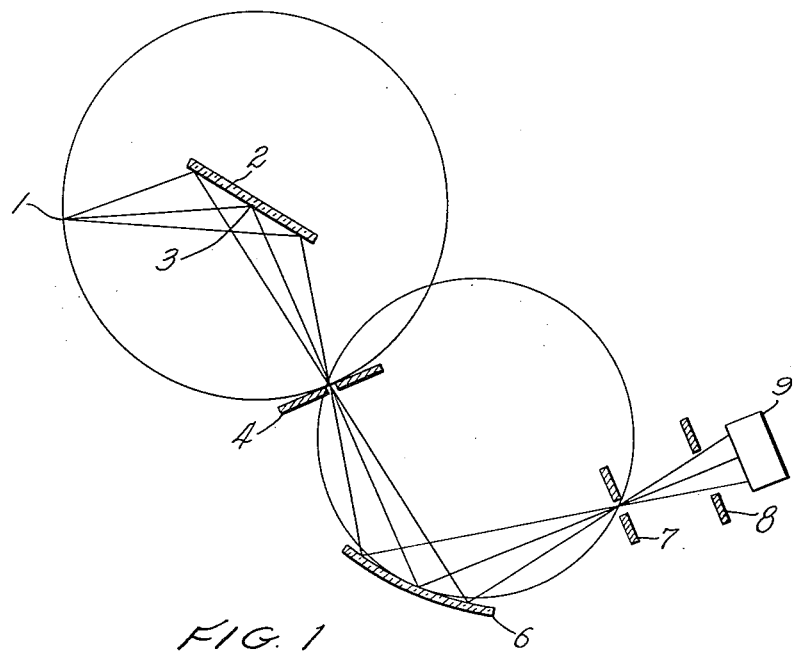
Figure 2:
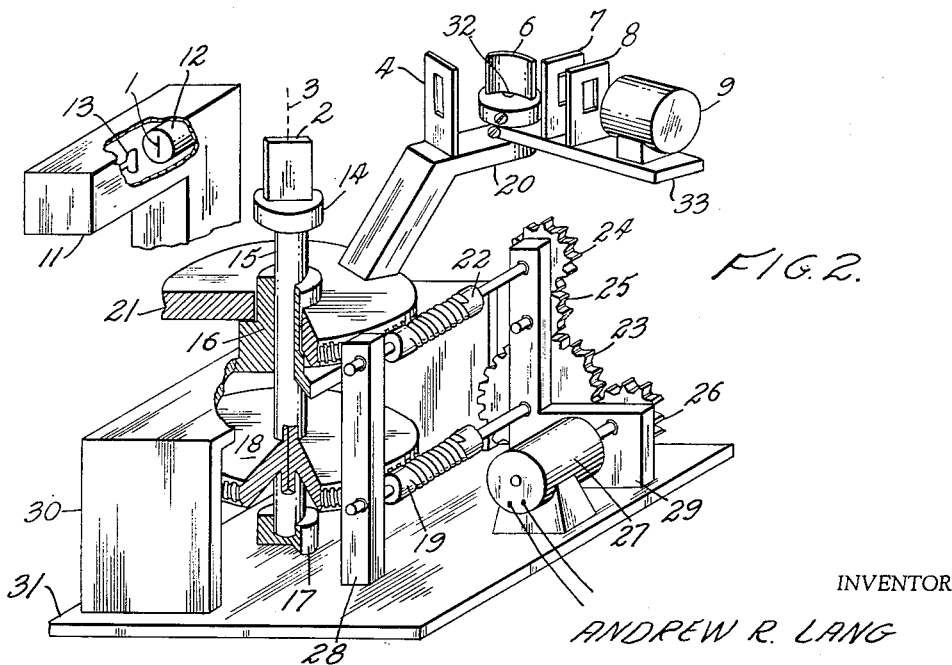

The invention will now be more fully described in connection with the accompanying drawings, in which Fig. 1 is a diagrammatic view illustrating geometric principles underlying the invention; and Fig. 2 is a perspective, partly in section and partly broken away, of a diffractometer embodying the invention.

A primary beam is diagrammatically shown in Fig. 1 diverging from a source 1 of X-rays, illustrated in Fig. 2 as a straight-line source. The straight-line source 1 is diagrammatically indicated in Fig. 1 as perpendicular to the plane of the drawing, which may represent the scanning plane. The primary X-ray beam is shown in Fig. 1 diverging toward an X-ray diffraction reflection specimen 2 that it is desired to analyze. It is customary to adjust the support for the specimen 2, shown in Fig. 2 at 14, rotatably about an axis 3 substantially perpendicular to the primary diverging X-ray beam and parallel to the straight-line X-ray source 1. The center or median ray of the incident primary diverging X-ray beam is therefore shown impinging upon a central part of the specimen 2 at 3, approximately half-way between the extreme rays of the diverging beam. The divergence of the primary X-ray beam is usually in the range of from one to four degrees. From the specimen 2, the primary beam is reflected by diffraction in the form of an X-ray beam that converges to a straight-line focus parallel to the straight-line source 1.

A barrier 4 is provided with a straight-line scanning slit parallel to the straight-line source 1 of X-rays. For definiteness, this slit will hereinafter be referred to as a reception slit. The barrier 4 is adjustable to adjust the reception slit along the surface of a circular cylinder coaxial with the axis of rotation 3. The straight-line source 1 of X-rays constitutes a line element of the cylinder. Scanning of the diffraction spectrum of the X-ray beam converging from the specimen 2 is effected by adjusting the barrier 4 until the reception slit is positioned at the straight-line focus of this converging X-ray beam.

With the apparatus as so far described, it is present-day practice to receive the X-rays traveling through the detection slit with the aid of a detector, not shown. Under conditions where the reflecting surface of the specimen 2 is flat, the operation is in accordance with the well-known Bragg-Brentano focussing geometry.

In some applications, however, apparatus of this character is subject to limitations that seriously reduce its usefulness. One such limitation, for example, has reference to the quality of the diffraction pattern obtained.

This will be understood from the following considerations. The straight-line source 1 of X-rays is shown in Fig. 2 produced by bombarding the target 12 of an X-ray tube 11 by a beam of electrons emitted from a filament 13. The X-rays so emitted, however, are not confined to only the single wavelength X-radiations characteristic of the tube target 12 which are diffracted by the specimens according to Bragg's law. The X-rays so emitted and diffracted by the specimen 2 cover a continuous range of wavelengths, known as "White" radiation. A continuous "white"-radiation background is thus produced, which tends to obscure the relatively weak characteristic diffraction pattern, thereby reducing the precision of measurement of the intensity of even the strongest diffracted characteristic rays. The undesirable effect of the background is increased by the fluorescent radiation excited by the primary divergent X-ray beam impinging upon the specimen 2, by its spontaneous radioactivity, and by the so-called Compton incoherent scattering of the characteristic radiation in which a small change in wavelength is produced.

The precision of measurement is enhanced, in accordance with the present invention, by causing the converging X-ray beam reflected from the specimen 2 to travel through the reception slit in the barrier 4 as a diverging secondary X-ray beam, and by disposing in the path thereof a reflection crystal monochromator 6. A barrier 7 is provided with a straight-line slit parallel to the axis of rotation 3, disposed at the straight-line focus of convergence of the converging X-ray beam reflected by diffraction of the diverging secondary X-ray beam from the crystal monochromator 6. For definiteness, the slit of the barrier 7 will hereinafter be referred to as a detection slit. A detector 9 is disposed in the path of the X-ray beam transmitted through the detection slit. The crystal monochromator 6 is shaped to curve its lattice planes concavely in the form of concentric circular cylinders with axes parallel to the axis of rotation 3.

The focusing conditions of Johann or Johannson may be obtained by suitably spacing the crystal monochromator 6 from the barriers 4 and 7. The apertures of the reception and detection slits may be adjusted to adjust the range of wavelengths, centered on any required wavelength, that are finally received by the detector 9. This range will be determined solely by the widths of the reception and detection slits and by their angular relation to the crystal 6. This range may be made as narrow as desired. The degree of monochromatization and instrumental angular resolution, in scanning the specimen diffraction pattern, will thus be made independent of the quality or the state of perfection of the monochromatizing crystal 6. The radiation scattered by the specimen 2 that is slightly changed in wavelength from that of the incident characteristic radiation will therefore be eliminated. By this arrangement, it becomes also possible to separate the two components of characteristic radiation, the so-called $K_{a_1}$ and $K_{a_2}$ radiations, which are close together in wavelength, and that are commonly used together in the recording of diffraction patterns. The recording of the specimen diffraction pattern due to $K_{a_1}$ radiation only obviously results in increased resolution and greater ease in interpretation of the diffraction pattern. The improved results thus obtained may be improved still further with the aid of a slit of suitable aperture in a barrier 8, positioned before or behind barrier 7, wide enough to pass a beam of the degree of divergence required, but no wider. The resolution obtained in recording the diffraction pattern of the specimen 2 is determined largely by the divergence of the primary X-ray beam diverging from the straight-line source 1 and by the width of the slit 4. It is not dependent on the quality of the reflecting crystal 6.

Though it is not new to use monochromator crystals in diffractometers, such prior use has been subject to the disadvantage that the angular resolution of measurement of the specimen diffraction pattern and also the degree of monochromatisation have been limited by the degree of perfection of the monochromatising crystal. The present invention overcomes this disadvantage.

The support 14 is shown in Fig. 2 mounted on the upper end of a shaft 15 the axis of rotation of which is shown at 3. The lower end of the shaft 15 is mounted in a thrust bearing 17 secured upon a base plate 31. An intermediate portion of the shaft 15 is mounted in a bearing 16 provided upon a housing frame 30 secured to the base plate 31. The X-ray tube 11 is held in fixed position relative to the base plate 31. The shaft 15 is integral with a worm wheel 18 in the housing frame 30. The worm wheel 18 is driven from a worm 19.

The barriers 4, 7 and 8, the crystal monochromator 6 and the detector 9 are mounted upon a scanning arm 20 that is integral with a worm wheel 21 coaxial with the shaft 15. The worm wheel 21 is driven from a worm 22.

The worm wheels 18 and 21 are of the same diameter and have the same number of teeth. The worms 19 and 22, of identical construction, are journaled in plates 28 and 29, rising vertically from the base plate 31.

A gear 26 upon the shaft of a motor 27, mounted on the base plate 31, meshes with a gear 23 upon the shaft of the worm 19. The gear 23, in turn, through an idler 25, drives a gear 24 on the shaft of the worm 22. The diameter of the gear 23 is double that of the gear 24. The gear 23, therefore, has twice as many teeth as the gear 24. The worm wheel 21 and, therefore, the scanning arm 20 are thus rotated, in the same direction of rotation, at double the rate of rotation of the worm wheel 18 and the shaft 15 that is fixed thereto.

The worm wheels 18 and 21 are initially adjusted rotatably to provide equal angles of incidence and reflection of the center or median rays of the primary diverging beam and the converging beam reflected from the specimen 2, as illustrated in Fig. 1, in accordance with the Bragg-Brentano focussing geometry. This will ensure that these angles shall be maintained equal in all positions of rotatable adjustment of the worm wheels 18 and 21 effected by the motor 27. The next adjustment is to remove the detector 9 from the position shown, and to position it behind the reception slit in the barrier 4. With the detector 9 in this position behind the reception slit, the scanning arm 20 is then rotatably adjusted about the axis of rotation 3 until a strong diffracted beam is observed with the detector 9 through the reception slit. The detector 9 is then restored to the illustrated position. The monochromator 6 and the barriers 7 and 8, as well as the apertures of the slits thereof, are finally adjusted, in cooperation with the adjustment of the aperture of the reception slit in the barrier 4, until the detector 9, in the illustrated position, records the highest intensity for the degree of monochromatization desired in the particular experiment.

It may be necessary to readjust the positions of the crystal monochromator 6, the barriers 7 and 8 and the detector 9 when different monochromator crystals 6 are employed. To this end, the monochromator crystal 6, the barriers 7 and 8 and the detector 9 are shown in Fig. 2 mounted upon an extension arm 33 that is adjustably pivoted about a pivot 32 of the scanning arm 20. The extension arm 33 is fixed in adjusted position by a set screw, and the monochromator 6 is fixed in adjusted position by another set screw. The set screws bear upon the common pivot 32 about which the monochromator 6 and the extension arm 33 are pivotally adjustable.

Modifications may be made by persons skilled in the art and all such are considered to fall within the spirit and scope of the invention as defined in the appended claims.

What is claimed is:

1. An X-ray diffractometer comprising means for supporting in the path of a primary X-ray beam diverging from a source of X-rays an X-ray-diffraction reflection specimen in order that the X-rays may be reflected therefrom by diffraction in the form of an X-ray beam converging to a focus, a barrier having a straight-line reception slit disposed at the focus in order that the X-rays may travel through the reception slit in the form of a diverging secondary X-ray beam, a reflection crystal monochromator disposed in the path of the diverging secondary X-ray beam for reflecting the diverging secondary X-ray beam into a beam of X-rays converging to a second focus, a barrier having a straight-line detection slit disposed at the second focus, and a detector disposed in the path of the X-ray beam transmitted through the detection slit.

2. An X-ray diffractometer comprising means for supporting in the path of a primary X-ray beam diverging from a source of X-rays an X-ray-diffraction reflection specimen in order that the X-rays may be reflected therefrom by diffraction in the form of an X-ray beam converging to a focus, a barrier having a straight-line reception slit disposed at the focus in order that the X-rays may travel through the reception slit in the form of a diverging secondary X-ray beam, a reflection crystal monochromator disposed in the path of the diverging secondary X-ray beam for reflecting predetermined wavelength components of the diverging secondary X-ray beam into a beam of X-rays converging to a second focus, a barrier having a straight-lined detection slit disposed at the second focus for transmitting substantially only X-rays of the predetermined wave length reflected from the reflection crystal, and a detector disposed in the path of the X-ray beam transmitted through the detection slit.

3. An X-ray diffractometer comprising means for supporting in the path of a primary X-ray beam diverging from a source of X-rays and X-ray-diffraction reflection specimen in order that the X-rays may be reflected therefrom by diffraction in the form of an X-ray beam converging to a focus, the supporting means being rotatably adjustable about an axis susbtantially perpendicular to the primary beam, a barrier having a straight-line reception slit disposed parallel to the said axis of rotation along the surface of a circular cylinder coaxial with the said axis of rotation and along the surface of which the source of X-rays and the focus are disposed, the barrier being adjustable along the cylindrical surface to adjust the reception slit to the position of the focus in order that the X-rays may travel through the reception slit in the form of a diverging secondary X-ray beam, a reflection crystal monochromator disposed in the path of the diverging secondary X-ray beam for reflecting the diverging secondary X-ray beam into a beam of X-rays converging to a second focus, a barrier having a straight-line detection slit disposed parallel to said axis of rotation at the second focus, and a detector disposed in the path of the X-ray beam transmitted through the detection slit, the crystal monochromator, the second-named barrier and the detector being adjustable along the surfaces of respective circular cylinders coaxial with the said axis of rotation.

4. An X-ray diffractometer comprising means for supporting in the path of a primary X-ray beam diverging from a source of X-rays an X-ray-diffraction reflection specimen in order that the X-rays may be reflected therefrom by diffraction in the form of an X-ray beam converging to a focus, the supporting means being rotatably adjustable about an axis substantially perpendicular to the primary beam, a barrier having a straight-line reception slit disposed parallel to the said axis of rotation along the surface of a circular cylinder coaxial with the said axis of rotation and along the surface of which the source of X-rays and the focus are disposed, the barrier being adjustable along the cylindrical surface to adjust the reception slit to the position of the focus in order that the X-rays may travel through the reception slit in the form of a diverging secondary X-ray beam, there being disposed in the path of the diverging secondary X-ray beam a reflection crystal monochromator the lattice planes of which are concavely curved in the form of concentric circular cylinders with axes parallel to the said axis of rotation, a barrier having a straight-line detection slit disposed parallel to said axis of rotation at the straight-line focus of convergence of a converging X-ray beam reflected from the said concavely curved lattice planes, and a detector disposed in the path of the X-ray beam transmitted through the detection slit, the crystal monochromator, the second-named barrier and the detector being adjustable along the surfaces of respective circular cylinders coaxial with the said axis of rotation.

5. An X-ray diffractometer comprising means for supporting in the path of a primary X-ray beam diverging from a source of X-rays an X-ray-diffraction reflection specimen in order that the X-rays may be reflected therefrom by diffraction in the form of an X-ray beam converging to a focus, the supporting means being rotatably adjustable about an axis substantially perpendicular to the primary beam, a barrier having a straight-line reception slit disposed parallel to the said axis of rotation along the surface of a circular cylinder coaxial with the said axis of rotation and along the surface of which the source of X-rays and the focus are disposed, the barrier being adjustable along the cylindrical surface to adjust the reception slit to the position of the focus in order that the X-rays may travel through the reception slit in the form of a diverging secondary X-ray beam, there being disposed in the path of the diverging secondary X-ray beam a reflection crystal monochromator the lattice planes of which are concavely curved in the form of concentric circular cylinders with axes parallel to the said axis of rotation, a barrier having a straight-line detection slit disposed parallel to said axis of rotation at the straight-line focus of convergence of a converging X-ray beam reflected from the said concavely curved lattice planes, a detector disposed in the path of the X-ray beam transmitted through the detection slit, and means for rotatably adjusting the crystal monochromator, the second-named barrier and the detector as a unit about the said axis of rotation at double the rate of rotatable adjustment of the specimen about the said axis of rotation.

References Cited in the file of this patent

UNITED STATES PATENTS

| | | |
|---|---|---|
| 2,452,045 | Friedman | Oct. 26, 1948 |
| 2,474,835 | Friedman | July 5, 1949 |
| 2,511,152 | Ekstein | June 13, 1950 |
| 2,532,810 | Harker | Dec. 5, 1950 |
| 2,540,821 | Harker | Feb. 6, 1951 |